United States Patent
Song et al.

(10) Patent No.: US 7,968,818 B2
(45) Date of Patent: Jun. 28, 2011

(54) APPARATUS AND METHOD FOR WELDING STRAP CONNECTIONS BETWEEN INNER GRID STRAPS OF SPACER GRID USING LASER TOOL, AND SPACER GRID MANUFACTURED USING THE SAME

(75) Inventors: Kee Nam Song, Daejeon-si (KR); Soo Sung Kim, Daejeon-si (KR); Kun Woo Song, Daejeon-si (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 1121 days.

(21) Appl. No.: 11/695,071

(22) Filed: Apr. 2, 2007

(65) Prior Publication Data

US 2007/0267391 A1    Nov. 22, 2007

(30) Foreign Application Priority Data

May 19, 2006  (KR) .................. 10-2006-0045190
Aug. 25, 2006  (KR) .................. 10-2006-0081049

(51) Int. Cl.
*B23K 26/00*    (2006.01)
(52) U.S. Cl. .......... 219/121.64; 219/121.63; 219/121.76
(58) Field of Classification Search ............ 219/121.64, 219/121.63, 121.76, 121.75, 121.78, 121.85
See application file for complete search history.

(56) References Cited

U.S. PATENT DOCUMENTS

| | | | | |
|---|---|---|---|---|
| 4,541,055 A | * | 9/1985 | Wolfe et al. | 700/166 |
| 4,556,776 A | * | 12/1985 | Duncan | 219/121.63 |
| 5,179,261 A | * | 1/1993 | Perrotti | 219/121.63 |
| 5,235,153 A | * | 8/1993 | Woelfl et al. | 219/121.66 |
| 5,252,804 A | * | 10/1993 | Griffaton | 219/121.63 |
| 5,359,172 A | * | 10/1994 | Kozak et al. | 219/121.64 |
| 6,211,482 B1 | * | 4/2001 | Findlan et al. | 219/69.17 |
| 6,236,702 B1 | * | 5/2001 | Chun et al. | 376/462 |
| 6,421,407 B1 | * | 7/2002 | Kang et al. | 376/439 |
| 6,791,057 B1 | * | 9/2004 | Kratzsch et al. | 219/121.63 |
| 7,044,355 B2 | * | 5/2006 | Haraguchi | 228/103 |

OTHER PUBLICATIONS

K. Wiemer et al., Remote Processing Applications Using ND:YAG Lasers in the Nuclear Power Industry, Conf. on Materials and Nuclear Power Bournemouth UK, Oct. 1996, pp. 359-366, Institute of Materials 1 Carlton House Terrace.

* cited by examiner

*Primary Examiner* — M. Alexandra Elve
(74) *Attorney, Agent, or Firm* — Bachman & LaPointe, P.C.

(57) ABSTRACT

An apparatus and method for welding strap connections between inner grid straps of a spacer grid using a laser tool, and a spacer grid manufactured by the same, in which the strap connections between the inner grid straps of the spacer grid are seam-welded continuously or intermittently using the laser tool, so that the structural strength of the spacer grid is increased, a spattering phenomenon, in which a welded material is spattered during welding, is reduced, and thermal deformation is reduced. Further, fine welding is possible, and thus the welded bead of each strap connection between the inner grid straps can have a small size, and the number of welding defects can be reduced. In addition, the flow resistance of a coolant is reduced, and thereby the pressure drop of the coolant can be reduced As a result, the load on a flow pump for the coolant can be reduced, and economic efficiency and safety can be improved.

9 Claims, 14 Drawing Sheets

APPARATUS AND METHOD FOR WELDING STRAP CONNECTIONS BETWEEN INNER GRID STRAPS OF SPACER GRID USING LASER TOOL, AND SPACER GRID MANUFACTURED USING THE SAME

BACKGROUND OF THE INVENTION

1. Field of the Invention

The present invention relates to an apparatus and method for welding strap connections between inner grid straps of a spacer grid using a laser tool, and a spacer grid manufactured using the same and, more particularly, to an apparatus and method for welding strap connections between inner grid straps of a spacer grid using a laser tool, and a spacer grid manufactured using the same, in which the strap connections between the inner grid straps of the spacer grid are seam-welded continuously or intermittently using the laser tool, so that the structural strength of the spacer grid is increased, a spattering phenomenon, in which a welded material is spattered during welding, is reduced, and thermal deformation is reduced, which makes fine welding possible, so that the welding bead of each strap connection between the inner grid straps can have a small size, and the number of welding defects can be reduced, and in which the flow resistance of a coolant is reduced, so that the pressure drop of the coolant can be reduced, and the load on a flow pump for the coolant can be reduced.

2. Description of the Related Art

In general, a spacer grid functions to support and hold a bundle of nuclear fuel rods by arranging grid straps, each of which has a spacer grid spring and dimples, in a matrix array and welding their intersections.

Currently, a commercially available spacer grid is used by spot-welding the intersections between the grid straps arranged in a matrix array. Therefore, the welding method and the quality of the intersections have a great influence on the structural performance of the spacer grid.

Such a spacer grid can increase the structural performance by improving the welding method and quality of the intersections, and thereby the characteristics of the nuclear fuel can be greatly improved.

The spacer grid for fuel rods in a light-water reactor basically has a weld structure at the intersections between inner grid straps, intersections between inner and outer grid straps, and corner joints between outer grid straps. Currently, when the spacer grid is manufactured by a domestic fuel producer, the corner joints between the outer grid straps are spot-welded using a laser, and the intersections between inner grid straps are also spot-welded using a laser.

Meanwhile, a current process of spot-welding the intersections between inner grid straps is performed through laser welding using six or seven spots. As such, a spattering phenomenon, in which a welded material is spattered around the spacer grid during welding, occurs as a result of the welding.

In addition, in the spot-welding process, high heat generated from the laser can cause a change in the dimensions of the spacer grid and thermal deformation. Hence, additional care must be taken.

As described above, the conventional method of welding the intersections between the inner grid straps of the spacer grid in order to support the nuclear fuel rods, as illustrated in FIG. 1, is performed by welding strap connections 150 between the inner grid straps 140a and 140b of the spacer grid 100. In this welding method, a welding bead after welding has a large size, fine welding is impossible, and the pressure drop of the coolant flowing in the reactor core becomes high due to the large welding bead.

The conventional method of welding the spacer grid gives rise to the spattering phenomenon and thermal deformation after spot-welding. Thus, fine welding is impossible, the size of the welding bead of the intersection in the spacer grid is large, and the flow resistance of the coolant increases. Ultimately, the pressure drop of the coolant is increased, which is responsible for increasing the load of a coolant flow pump. In order to increase the structural strength of the spacer grid and decrease the pressure drop of the coolant, a new method of welding the spacer grid must be developed.

To this end, it is critical to develop a welding technique using a super-precision laser and an optical transmission mechanism. In other words, spacer grid welding using the super-precision laser entails little thermal deformation, and makes fine welding possible, so that the welding bead can have a small size, the pressure drop of the coolant can be reduced, and the structural strength of the spacer grid can be greatly increased.

Accordingly, the welding method to be developed in the future is technology essential for the development of nuclear fuel for a nuclear power plant, and it is expected that such technical development will be actively carried out in advanced countries sooner or later.

In particular, the intersection spot-welding method performed at the upper and lower end of the spacer grid has a large welding bead and entails a large pressure drop, and reduces the flow area, and thus it greatly increases the load of the coolant pump, and decreases the design freedom of a nuclear reactor structure. For this reason, in order to increase the mechanical/structural stability of the spacer grid for the nuclear fuel rod bundle and decrease the pressure drop of the coolant, the introduction of new high-tech welding technology is required.

SUMMARY OF THE INVENTION

Accordingly, the present invention has been made keeping in mind the above problems occurring in the prior art, and an object of the present invention is to provide an apparatus and method for welding strap connections between inner grid straps of a spacer grid using a laser tool, and a spacer grid manufactured using the same, in which the strap connections between the inner grid straps of the spacer grid are seam-welded continuously or intermittently using the laser tool, so that the structural strength of the spacer grid is increased, a spattering phenomenon, in which a welded material is spattered during welding, is reduced, and thermal deformation is reduced, which makes fine welding possible, so that the welding bead of each strap connection between the inner grid straps can have a small size, and the number of welding defects can be reduced, and in which the flow resistance of a coolant is reduced, so that the pressure drop of the coolant can be reduced, and the load on a flow pump for the coolant can be reduced.

In order to achieve the above object, according to one aspect of the present invention, there is provided an apparatus for welding strap connections between inner grid straps of a spacer grid using a laser tool, in which the strap connections between the inner grid straps and between the inner and outer grid straps in the spacer grid for a nuclear fuel bundle are welded. The apparatus includes a laser tool including a pair of laser tools that have a cylindrical shape, and are spaced apart from each other by a predetermined interval, a plate-like connecting piece that is interposed between the laser tools in order to connect the laser tools, and optical fibers that are inserted into and connected to upper ends of the laser tools by optical fiber connectors and transmit laser beams, and a controller including a plate-like supporting piece that is connected to the center of the plate-like connecting piece of the laser tool, a movable piece that is connected to the plate-like supporting piece, and a linear driver that is connected to the movable piece.

Preferably, each of the laser tools may include an alignment lens provided on an upper inner side thereof in order to align the transmitted laser beam, a focusing lens provided on a lower side thereof in order to focus the laser beam passing through the alignment lens, and a prism provided below the focusing lens in order to transmit the laser beam focused by the focusing lens in a predetermined direction.

Here, the prism may be positioned at an angle of 45 degrees.

Meanwhile, each of the laser tools may include a through-hole formed at a suitable position in the lower outer circumference thereof so as to pass the laser beam transmitted through each prism.

Further, each of the laser tools may be provided with at least one gas line for supplying assistant gas thereto at a suitable position thereof, and one end of the gas line may be connected near each prism.

In addition, each of the laser tools may include an alignment lens provided on an upper inner side thereof in order to align the transmitted laser beam, a focusing lens provided on a lower side thereof in order to focus the laser beam passing through the alignment lens, and a concave copper mirror provided below the focusing lens in order to transmit the laser beam focused by the focusing lens in a predetermined direction.

Here, the concave copper mirror may have a tilt angle of 110 degrees.

Meanwhile, the movable piece may linearly move in a vertical direction.

Further, the linear driver may linearly move in a horizontal direction.

Here, the apparatus may further include a spacer grid jig that has fixing holes arranged in a grid shape in order to fix the spacer grid, and a laser tool jig that has a plurality of guide holes in order to vertically fix the laser tools of the laser tool.

According to another aspect of the present invention, there is provided a method for welding strap connections between inner grid straps of a spacer grid using an apparatus for welding the strap connections, wherein the apparatus comprises: a laser tool including a pair of laser tools spaced apart from each other by a predetermined interval, a plate-like connecting piece interposed between the laser tools in order to connect the laser tools, at least one gas line supplying each of the laser tools with assistant gas at a suitable position of each of the laser tools, optical fibers provided with optical fiber connectors in order to transmit laser beams, and an optical system having an alignment lens, a focusing lens, and a prism sequentially arranged in laser tools in a downward direction; a controller including a plate-like supporting piece that is connected to the center of the plate-like connecting piece of the laser tool, a movable piece that is connected to the plate-like supporting piece, and a linear driver that is connected to the movable piece; a laser tool jig; and a spacer grid jig. The method comprises: the step of fixing the spacer grid to the spacer grid jig, the step of controlling the controller to drive the laser tool in x, y, and z directions to a predetermined position above the strap connections between the inner grid straps of the spacer grid, the step of controlling the controller to move the movable piece in a vertical direction and inserting the laser tools around the strap connections between the inner grid straps of the spacer grid, the step of transmitting laser beams through the optical fibers introduced through the optical fiber connectors on upper ends of the laser tools, the step of applying the laser beams transmitted through the optical fibers to the-alignment lenses provided on upper inner sides of the laser tools, the step of focusing the laser beams, aligned and transmitted by the alignment lenses, onto the focusing lenses provided below the alignment lenses, the step of reflecting the laser beams focused by the focusing lenses through the prisms provided below the focusing lenses, and the step of welding the strap connections between the inner grid straps of the spacer grid by means of the laser beams reflected by the prisms.

Here, the method may further comprise the step of, when the laser tools are inserted around the strap connections between the inner grid straps of the spacer grid, vertically guiding the laser tools toward guide holes of the laser tool jig and inserting the laser tools into the guide holes.

Meanwhile, the method may further comprise the step of discharging the assistant gases from the gas lines to prevent the strap connections between the inner grid straps of the spacer grid from being oxidized.

Preferably, the method may further comprise the step of continuously or intermittently welding the strap connections between the inner grid straps of the spacer grid by means of the laser tools inserted around the strap connections between the inner grid straps of the spacer grid.

According to yet another aspect of the present invention, there is provided a spacer grid manufactured by the method for welding strap connections between inner grid straps of a spacer grid using a laser tool.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
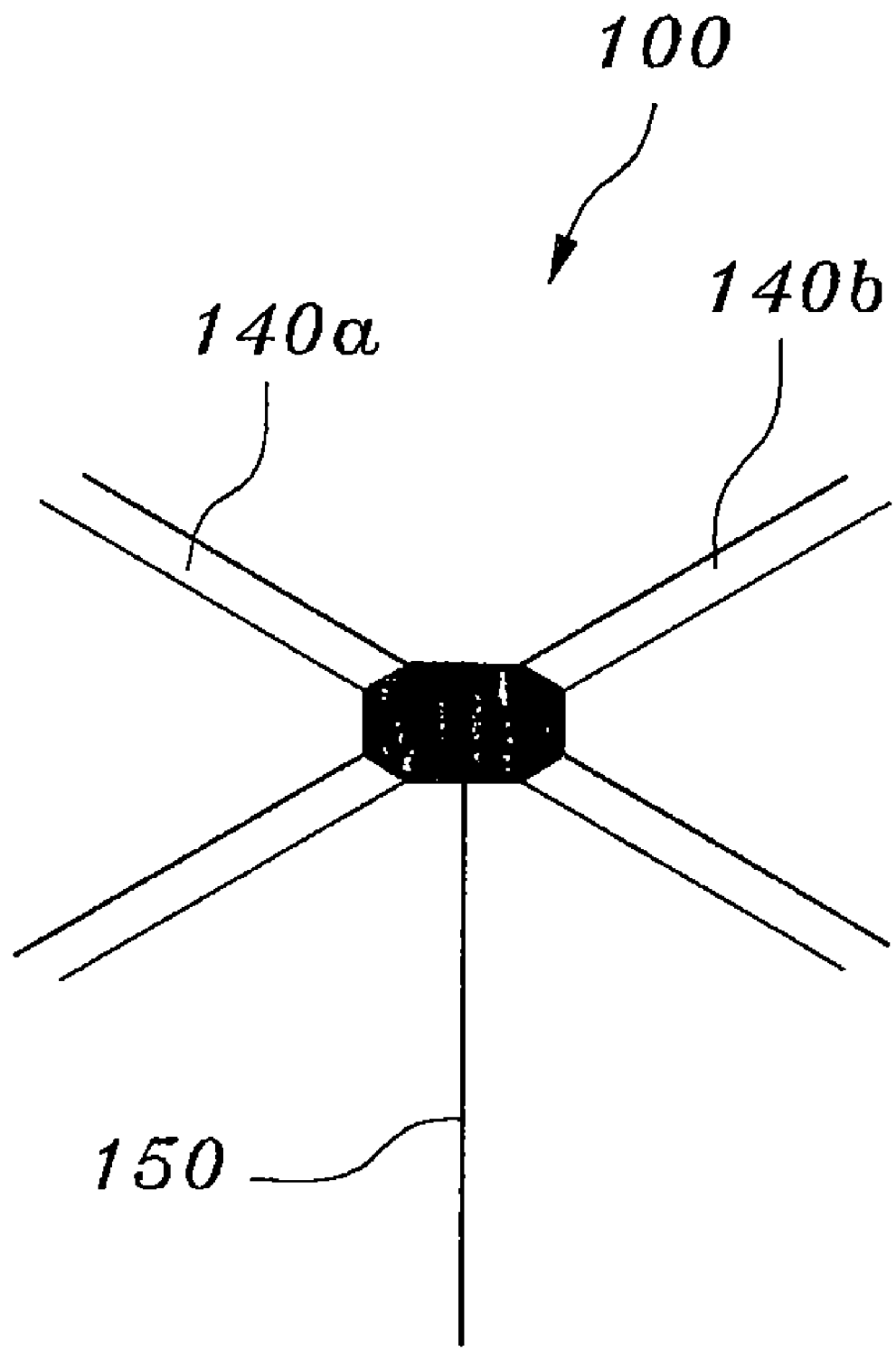
FIG. 1 schematically illustrates the state in which one intersection between inner grid straps of a spacer grid for a bundle of nuclear fuel rods is welded by a conventional welding machine.

Reference will now be made in greater detail to exemplary embodiments of the invention, which are illustrated in the accompanying drawings. Wherever possible, the same reference numerals will be used throughout the drawings and the description to refer to the same or like parts.

Figure 2:
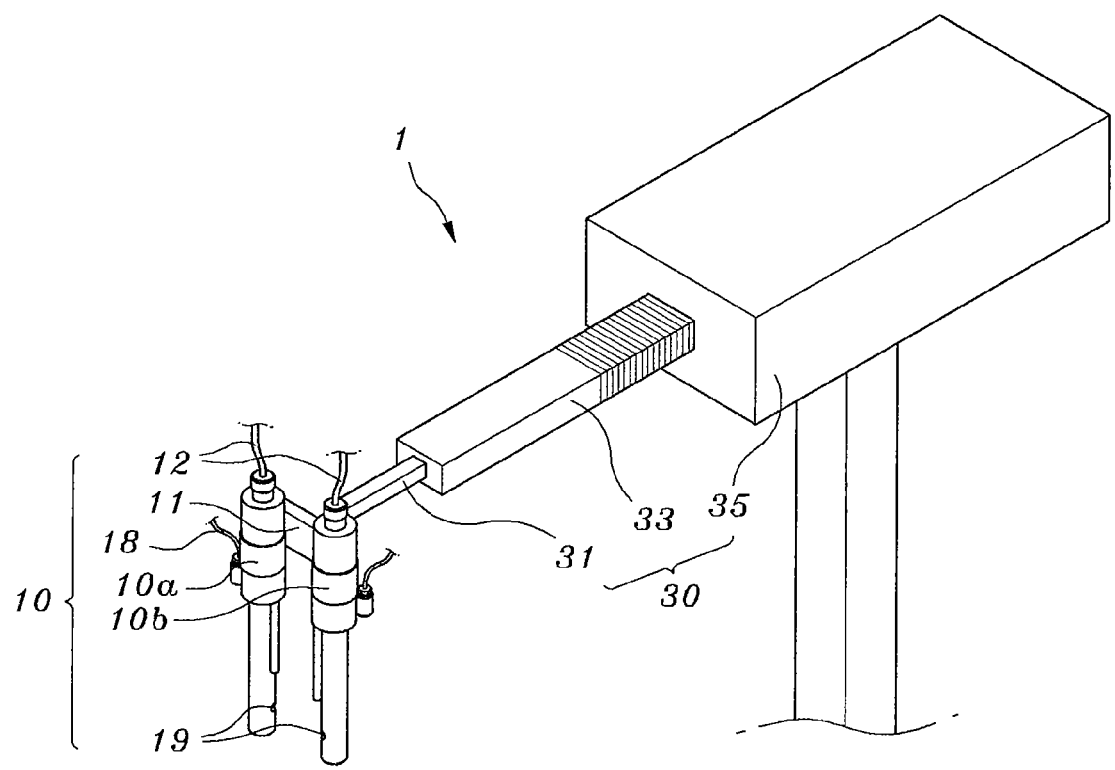
FIG. 2 schematically illustrates an apparatus for welding strap connections between inner grid straps of a spacer grid using a laser tool in accordance with an embodiment of the present invention.
Figure 3:
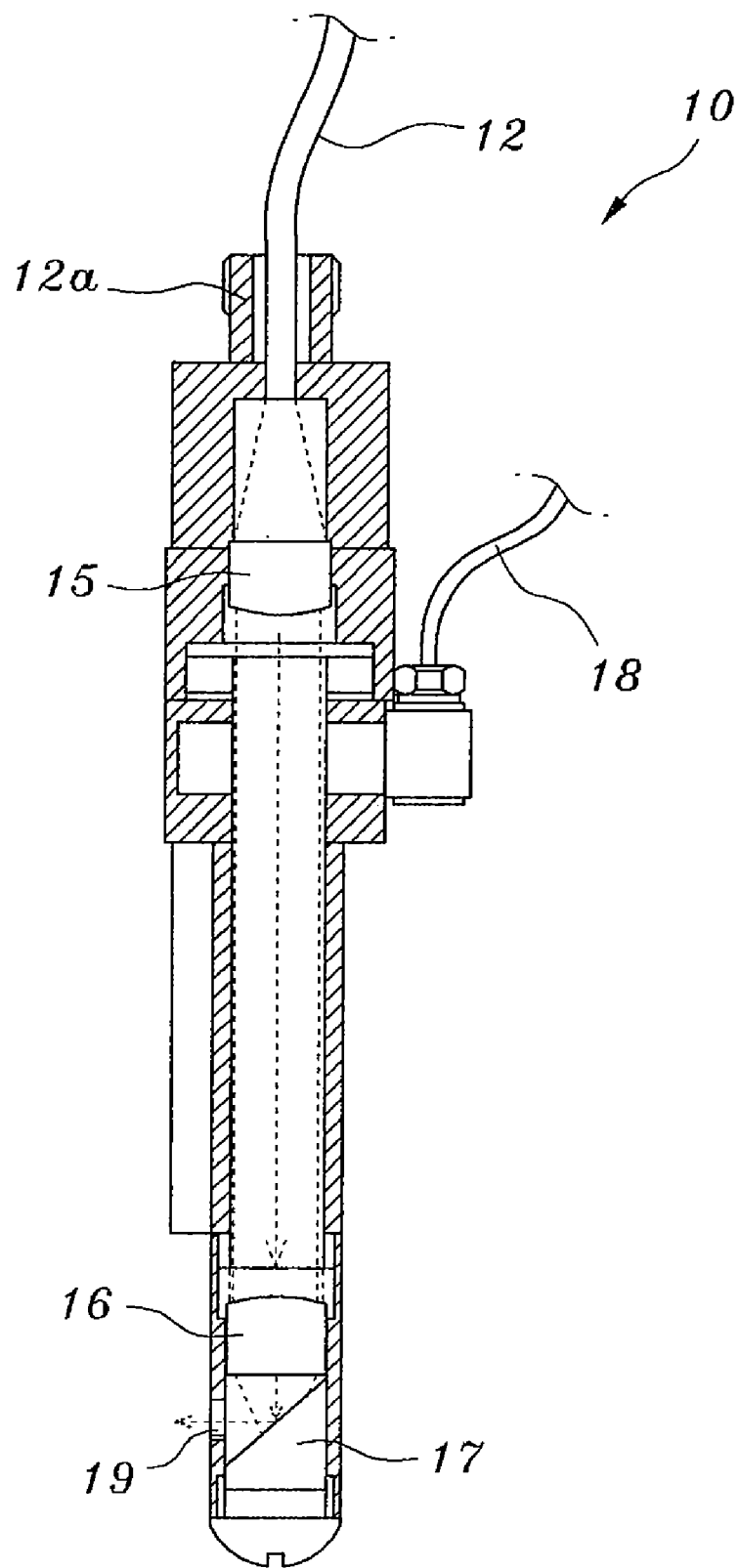
FIG. 3 is a sectional view illustrating a laser tool of an apparatus for welding strap connections between inner grid straps of a spacer grid using the laser tool in accordance with an embodiment of the present invention.
Figure 4:
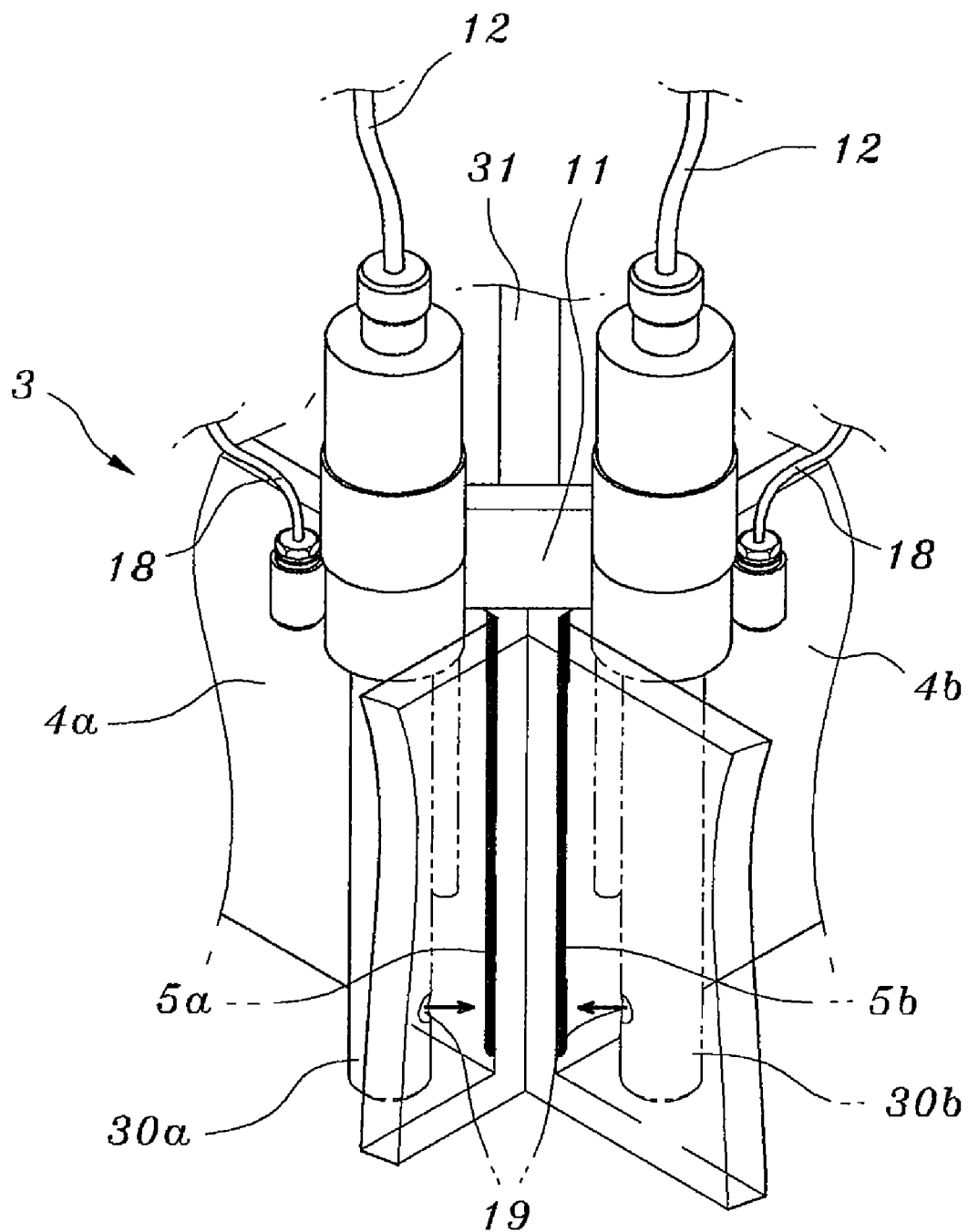
FIG. 4 schematically illustrates the operation of an apparatus for welding strap connections between inner grid straps of a spacer grid using a laser tool in accordance with an embodiment of the present invention.
Figure 5:
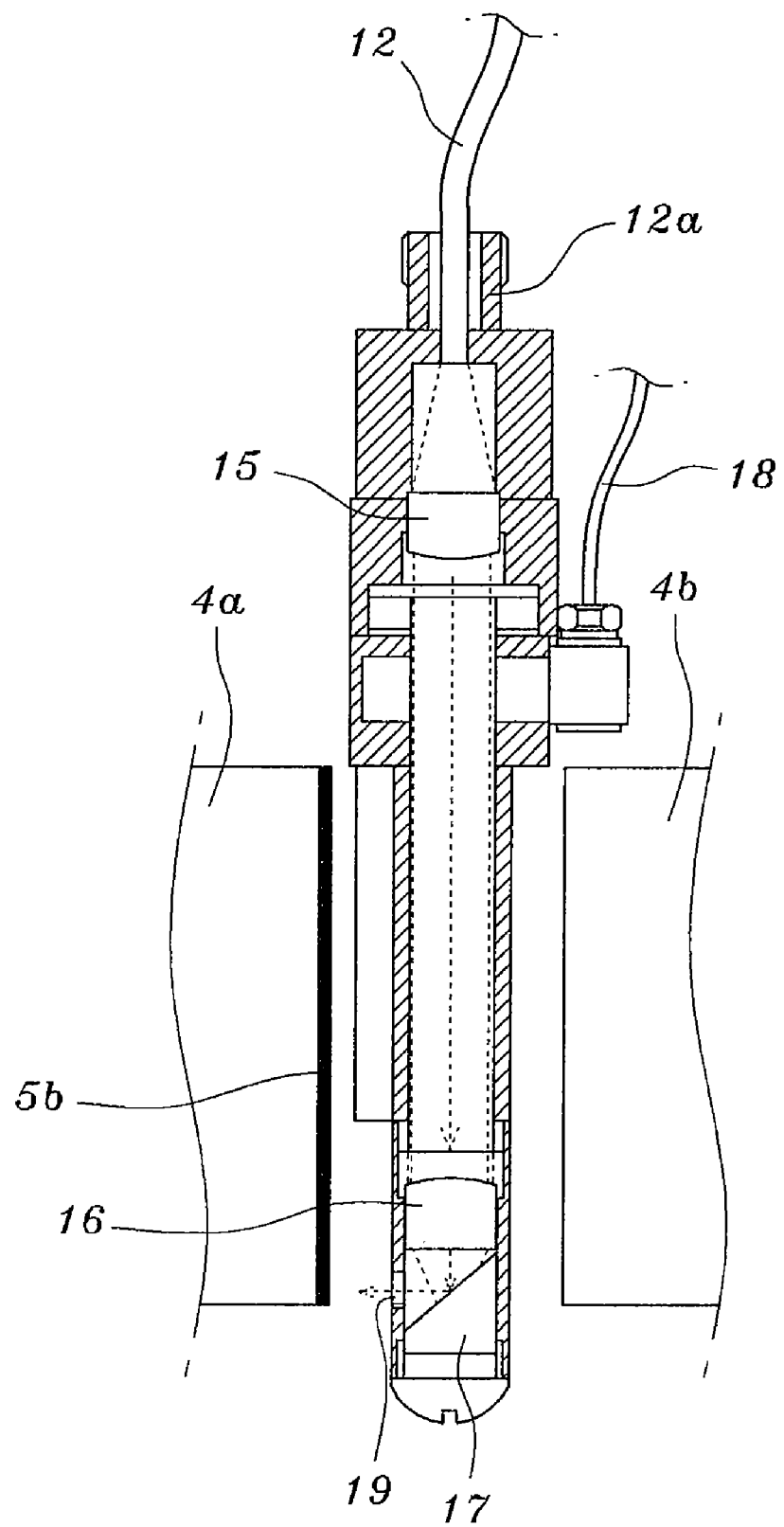
FIG. 5 is a sectional view schematically illustrating a process of performing laser-welding when an apparatus for welding strap connections between inner grid straps of a spacer grid using a laser tool is disposed between the inner grid straps of the spacer grid, in accordance with an embodiment of the present invention.
Figure 6:
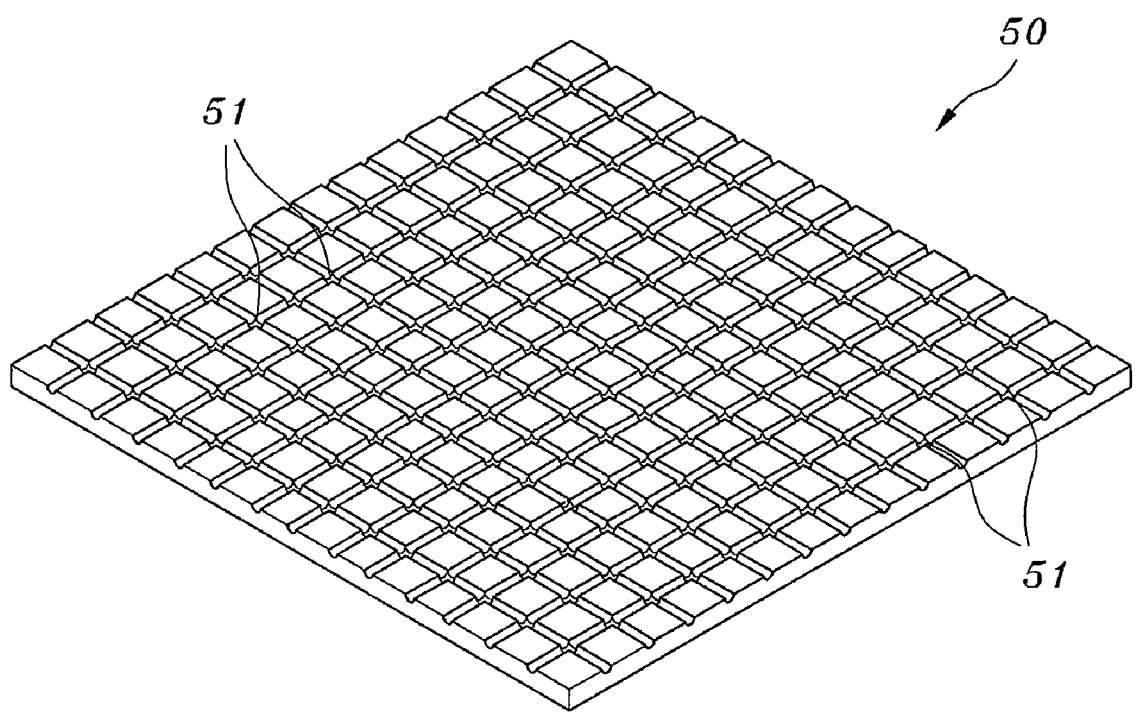
FIG. 6 is a perspective view schematically illustrating a spacer grid jig applied to an apparatus for welding strap connections between inner grid straps of a spacer grid using a laser tool in accordance with an embodiment of the present invention.
Figure 7:
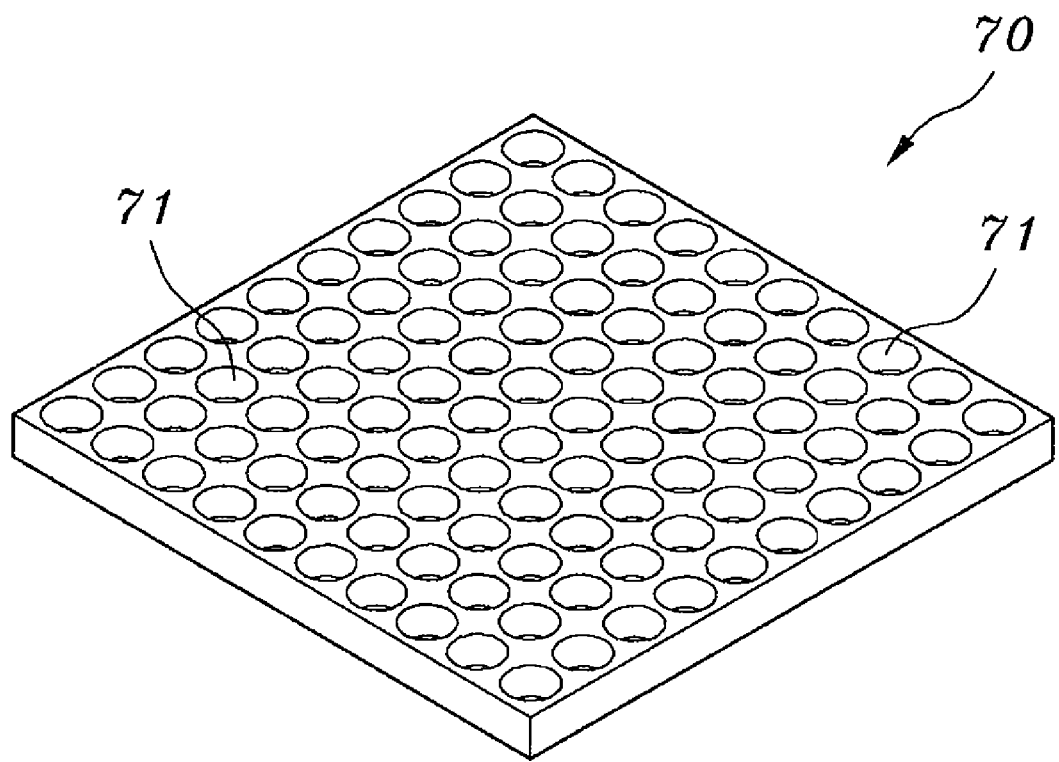
FIG. 7 is a perspective view schematically illustrating a laser tool jig applied to an apparatus for welding strap connections between inner grid straps of a spacer grid using a laser tool in accordance with an embodiment of the present invention.
Figure 8:
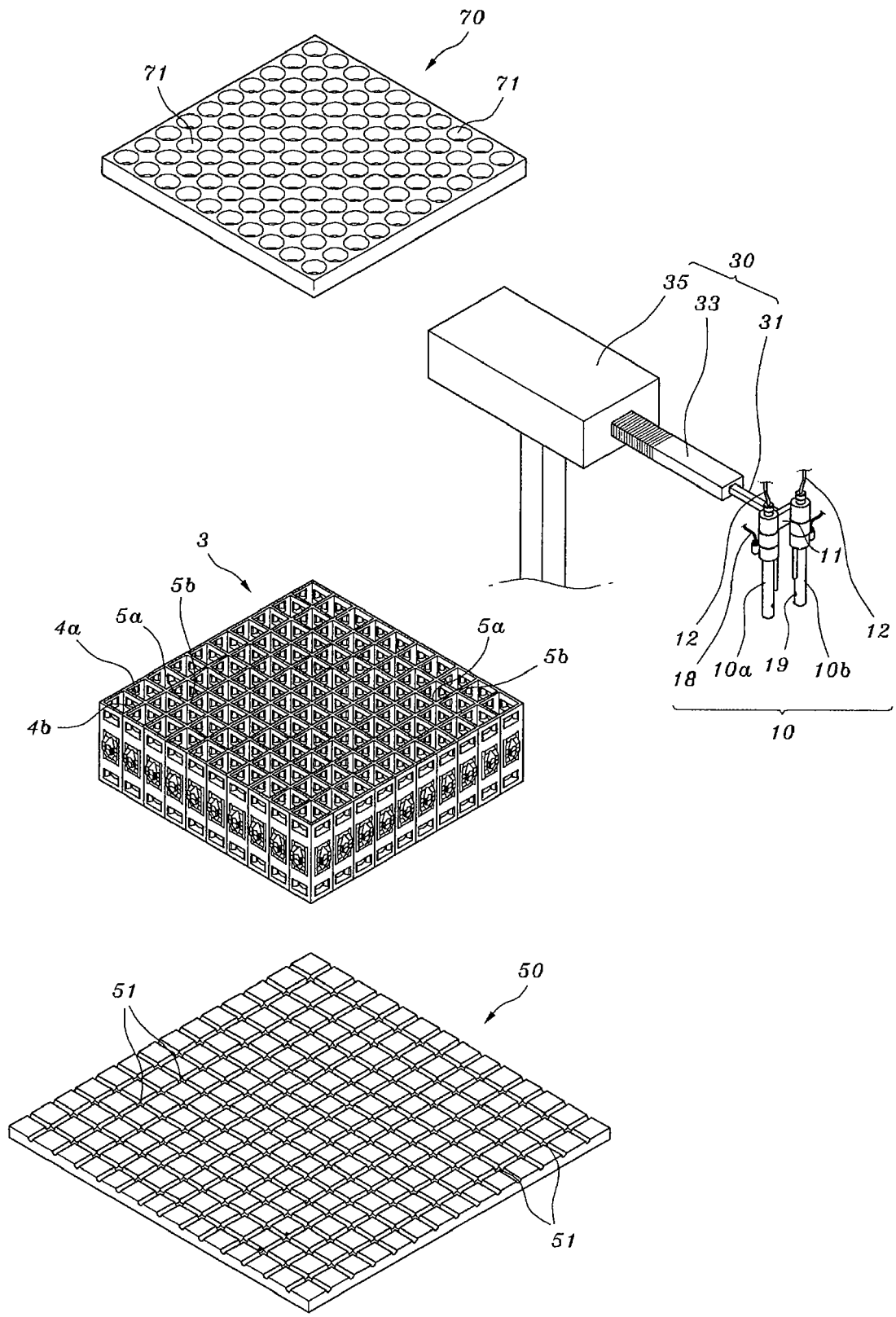
FIGS. 8, 9 and 10 schematically illustrate a process of welding strap connections between inner grid straps of a spacer grid using an apparatus for welding strap connections between inner grid straps of a spacer grid using a laser tool in accordance with an embodiment of the present invention.
Figure 9:
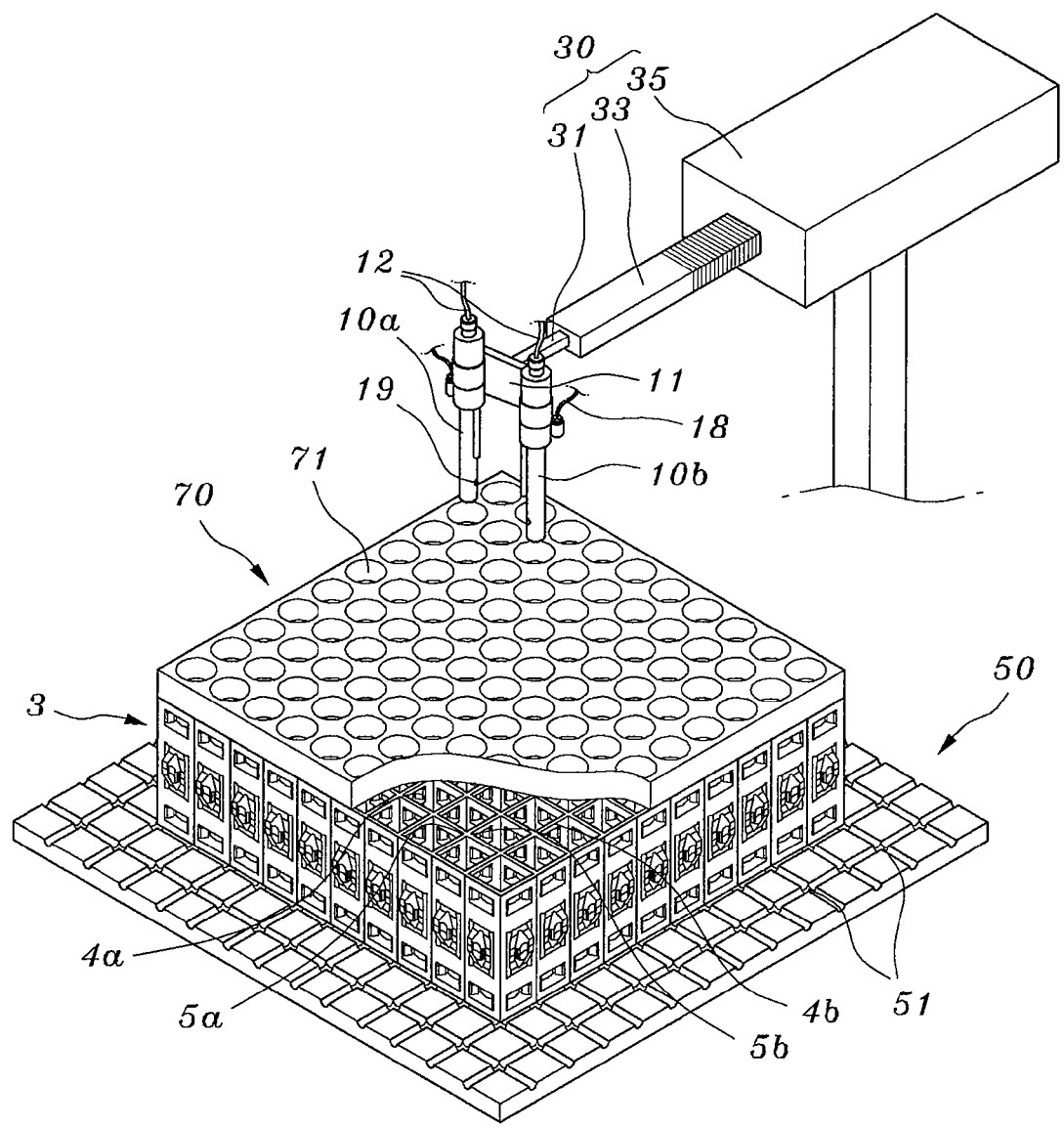
Figure 10:
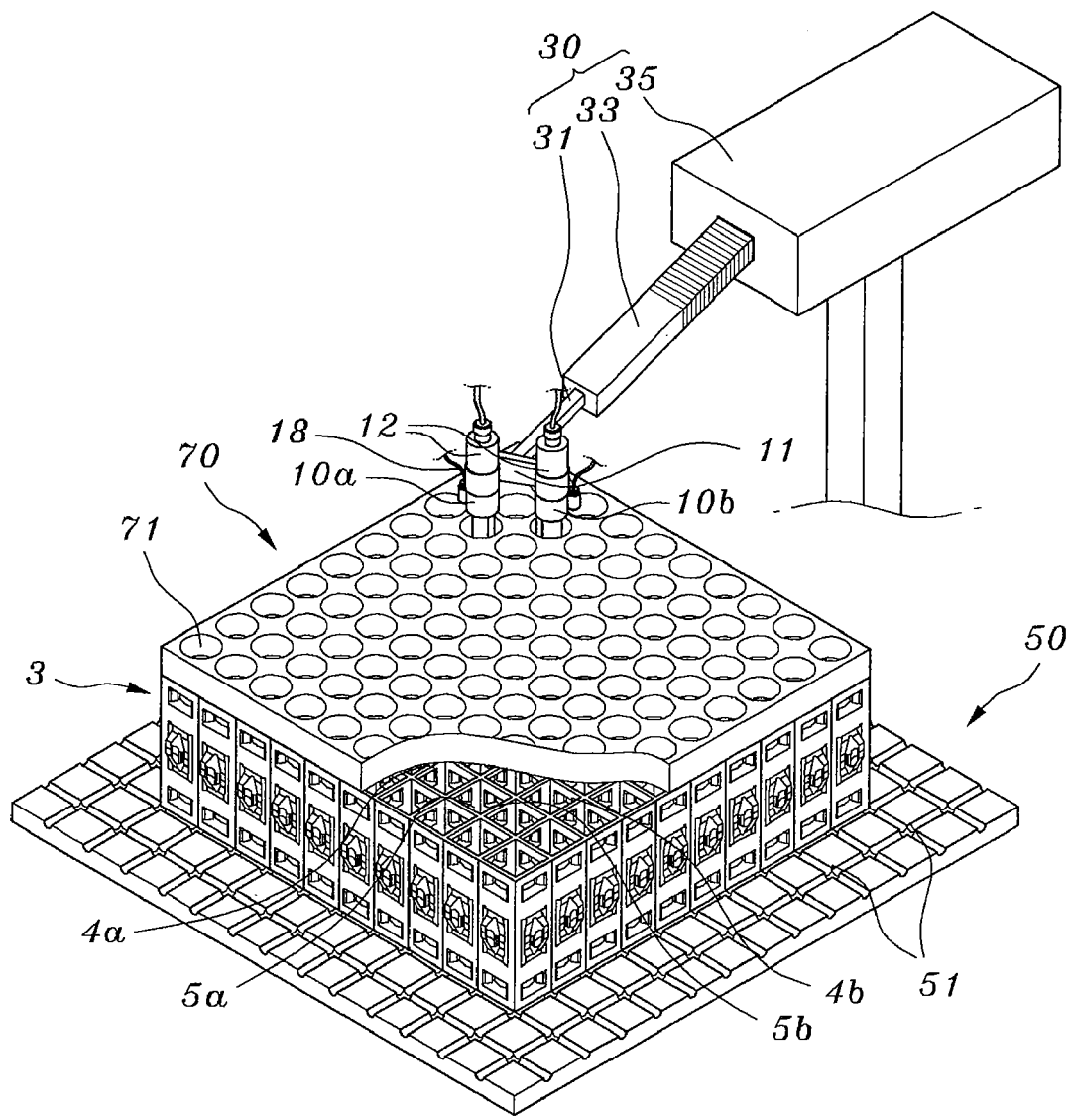
Figure 11:
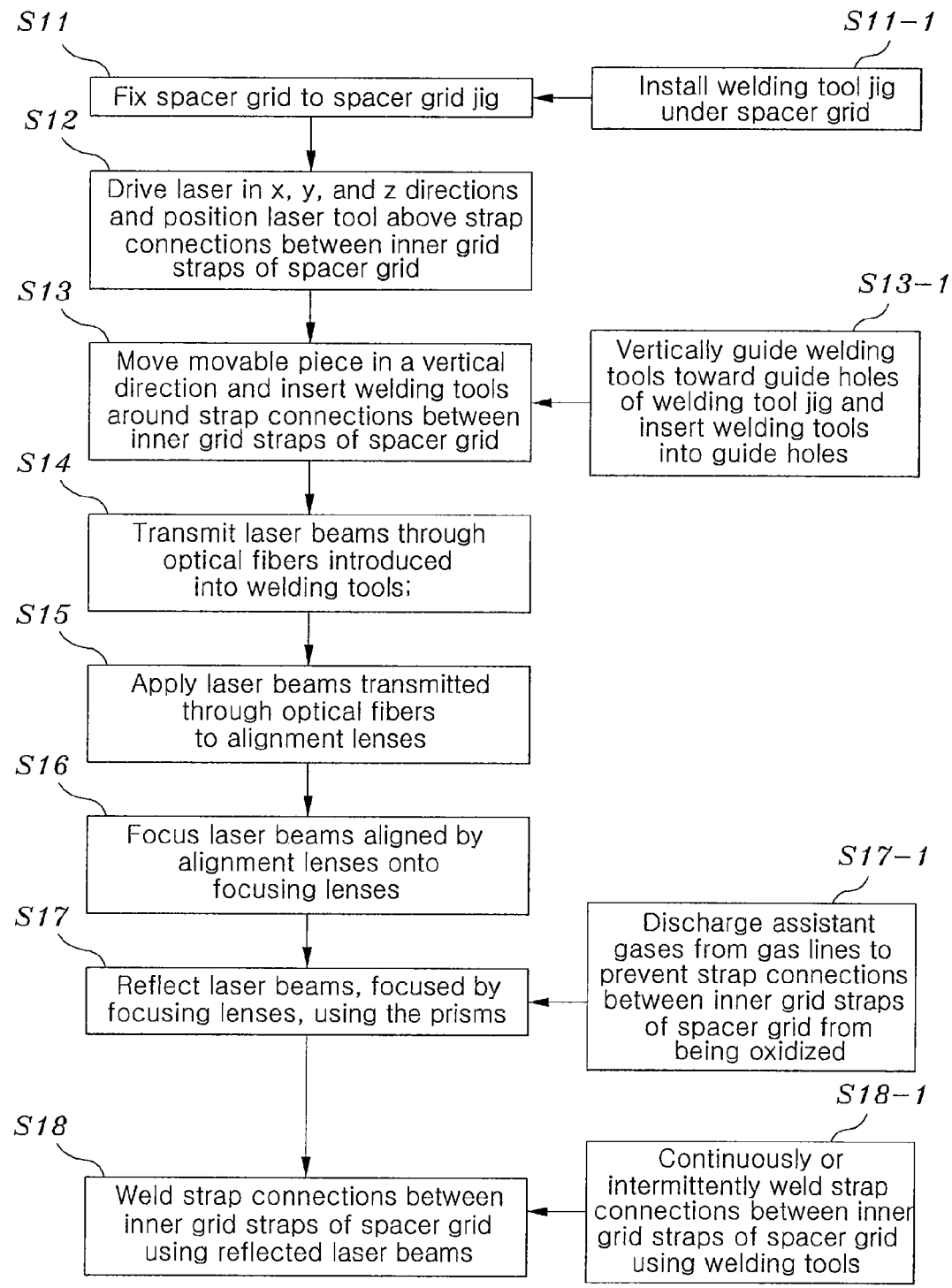
FIG. 11 is a flow chart illustrating a process of welding strap connections between inner grid straps using an apparatus for welding strap connections between inner grid straps of a spacer grid using a laser tool in accordance with an embodiment of the present invention.

FIG. 2 schematically illustrates an apparatus for welding strap connections between inner grid straps of a spacer grid using a laser tool in accordance with an embodiment of the present invention. FIG. 3 is a sectional view illustrating a laser tool in an apparatus for welding strap connections between inner grid straps of a spacer grid using the laser tool in accordance with an embodiment of the present invention. FIG. 4 schematically illustrates the operation of an apparatus for welding strap connections between inner grid straps of a spacer grid using a laser tool in accordance with an embodiment of the present invention. FIG. 5 is a sectional view schematically illustrating a process of performing laser-welding while an apparatus for welding strap connections between inner grid straps of a spacer grid using a laser tool is disposed between the inner grid straps of the spacer grid, in accordance with an embodiment of the present invention. FIG. 6 is a perspective view schematically illustrating a spacer grid jig applied to an apparatus for welding strap connections between inner grid straps of a spacer grid using a laser tool in accordance with an embodiment of the present invention. FIG. 7 is a perspective view schematically illustrating a laser tool jig applied to an apparatus for welding strap connections between inner grid straps of a spacer grid using a laser tool in accordance with an embodiment of the present invention. FIGS. 8, 9 and 10 schematically illustrate a process of welding strap connections between inner grid straps of a spacer grid using an apparatus for welding strap connections between inner grid straps of a spacer grid using a laser tool in accordance with an embodiment of the present invention. FIG. 11 is a flow chart illustrating a process of welding strap connections between inner grid straps using an apparatus for welding strap connections between inner grid straps of a spacer grid using a laser tool in accordance with an embodiment of the present invention.

As illustrated in the figures, the apparatus for welding strap connections between inner grid straps of a spacer grid using a laser tool in accordance with an embodiment of the present invention includes a laser tool 10 and a controller 30.

The laser tool 10 includes a pair of laser tools 10a and 10b that have a cylindrical shape and are spaced apart from each other by a predetermined interval, a plate-like connecting piece 11 that is interposed between the laser tools 10a and 10b in order to connect the laser tools 10a and 10b, and optical fibers 12 that are inserted into and connected to upper ends of the laser tools 10a and 10b through optical fiber connectors 12a and transmit laser beams.

Here, each of the laser tools 10a and 10b is provided with an alignment lens 15 on an upper inner side thereof in order to align the laser beam transmitted through each optical fiber 12 that is inserted into and connected to the upper end of each of the laser tools 10a and 10b through each optical fiber connector 12a, a focusing lens 16 on a lower side thereof for focusing the laser beam passing through the alignment lens 15, and a prism 17 below the focusing lens 16 for refracting and transmitting the laser beam focused by the focusing lens 16 at a predetermined angle.

Herein, the laser beam, which is aligned through the alignment lens 15 and focusing lens 16 in each of the laser tools 10a and 10b, is adapted to be reflected from the prism 17 spaced apart from the focusing lens 16 by a predetermined interval and to weld strap connections 5a and 5b between inner grid straps 4a and 4b of a spacer grid 3. At this time, if the laser beams emitted from the outside are transmitted, aligned, focused, and reflected in order to easily weld the strap connections 5a and 5b between the inner grid straps 4a and 4b of the spacer grid 3, the prism 17 provided inside each of the laser tools 10a and 10b may use a convex mirror.

Further, although the alignment lens 15, the focusing lens 16, and the prism 17 are mounted in each of the laser tools 10a and 10b, if the applied laser beams are focused and reflected to easily weld the strap connections 5a and 5b between the inner grid straps 4a and 4b of the spacer grid 3, each lens may be selected from among various other kinds of lenses.

Here, each prism 17 is preferably positioned at an angle of 45 degrees. In other words, each prism 17 located on the lower inner side of each of the laser tools 10a and 10b is positioned at an angle of 45 degrees in order to precisely align the welding position of the reflected laser beam when the laser beams, aligned and focused through the alignment lenses 15 and the focusing lenses 16, are radiated in order to weld the strap connections 5a and 5b between the inner grid straps 4a and 4b of the spacer grid 3.

Herein, although each prism 17 is positioned at an angle of 45 degrees, each prism 17 is not limited to this angle as long as the laser beams reflected by the prisms 17 can be precisely aligned and applied to the strap connections 5a and 5b between the inner grid straps 4a and 4b of the spacer grid 3.

Meanwhile, herein, the prisms 17 located in the laser tools 10a and 10b reflect the laser beams aligned and focused by the alignment lenses 15 and the focusing lenses 16 to easily weld the strap connections 5a and 5b between the inner grid straps 4a and 4b of the spacer grid 3. However, each prism 17 may be replaced by a concave copper mirror (not shown).

Such a concave copper mirror preferably has a tilt angle of 110 degrees.

Meanwhile, the prisms 17 provided on the lower inner sides of the laser tools 10a and 10b are linearly symmetrical with each other. In other words, when the strap connections 5a and 5b between the inner grid straps 4a and 4b of the spacer grid 3 are laser-welded, the prisms 17 provided on the lower inner sides of the laser tools 10a and 10b are arranged to be linearly symmetrical with each other in order to weld the symmetrical strap connections 5a and 5b between the inner grid straps 4a and 4b using the reflected laser beams.

Herein, the prisms 17 provided on the lower inner sides of the laser tools 10a and 10b are fixed at predetermined angles, and thereby do not vary in position or in angle. Thus, upon laser-welding, the prisms 17 are precisely arranged in order to adjust welding positions of the strap connections 5a and 5b between the inner grid straps 4a and 4b of the spacer grid 3.

Meanwhile, a through-hole 19 is formed at a suitable position in the lower outer circumference of each of the laser tools 10a and 10b so as to pass the laser beam reflected through each prism 17.

Here, each of the laser tools 10a and 10b is provided with at least one gas line 18 for supplying assistant gas thereto at a suitable position thereof. One end of the gas line 18 is connected near each prism 17. In other words, the gas lines 18 extending from the outside are provided at suitable positions of the outer circumferences of the laser tools 10a and 10b respectively, and one end of each gas line 18 is connected near the prism 17 provided on the lower inner side of each of the laser tools 10a and 10b.

The assistant gas introduced into the prism 17 of each of the laser tools 10a and 10b through each gas line 18 is argon (Ar) gas.

As described above, the gas lines 18 are connected to the laser tools 10a and 10b respectively, and are supplied with the assistant gases. Thereby, the strap connections 5a and 5b between the inner grid straps 4a and 4b of the spacer grid 3 are prevented from being oxidized.

Herein, the assistant gases, Ar gases, are supplied into the laser tools 10a and 10b through respective gas lines 18, and thereby prevent the strap connections 5a and 5b between the inner grid straps 4a and 4b of the spacer grid 3 from being oxidized. However, if the strap connections 5a and 5b between the inner grid straps 4a and 4b of the spacer grid 3 are easily prevented from being oxidized, various other gases may be supplied through the gas lines 18.

Further, at least one gas line 18 is installed at a suitable position of the outer circumference of each of the laser tools 10a and 10b. However, each gas line 18 may be installed on the inside of each of the laser tools 10a and 10b.

The controller 30 includes a plate-like supporting piece 31, one end of which is connected to the center of the plate-like connecting piece 11 of the laser tool 10, a movable piece 33, one end of which is connected to the other end of the plate-like supporting piece 31, and a linear driver 35, one end of which is connected to the other end of the movable piece 33.

Here, the movable piece 33 is adapted to move in upward and downward directions, while the linear driver 35 is adapted to move in horizontal directions. Specifically, when the strap connections 5a and 5b between the inner grid straps 4a and 4b of the spacer grid 3 are welded, the movable piece 33 moves in vertical directions in order to insert the laser tool 10 having the laser tools 10a and 10b around the strap connections 5a and 5b between the inner grid straps 4a and 4b of the spacer grid 3, while the linear driver 35 moves in horizontal directions so as to allow the laser tool 10 having the laser tools 10a and 10b to be located above the strap connections 5a and 5b between the inner grid straps 4a and 4b of the spacer grid 3.

As described above, the laser tool 10 is positioned above the spacer grid 3 by means of the horizontal movement of the linear driver 35 and the vertical movement of the movable piece 33, and then is inserted around the strap connections 5a and 5b between the inner grid straps 4a and 4b of the spacer grid 3, so that the strap connections 5a and 5b between the inner grid straps 4a and 4b of the spacer grid 3 can be welded.

Herein, the movable piece 33 is adapted to linearly move in the vertical directions, but the plate-like supporting piece 31 may move in the vertical directions.

Further, the movable piece 33 is adapted to linearly move in the vertical directions, but it may move in both vertical and horizontal directions.

Here, the apparatus 1 for welding inner grid straps of a spacer grid using a laser tool in accordance with the present invention includes a spacer grid jig 50, which fixes the spacer grid 3, and a laser tool jig 70, which vertically guides the laser tools 10a and 10b inserted around the strap connections 5a and 5b between the inner grid straps 4a and 4b of the spacer grid 3 and vertically fixes the laser tools 10a and 10b.

To this end, the spacer grid jig 50 has the shape of a plate-like grid in which a plurality of fixing holes 51 for positioning and fixing the spacer grid 3 is formed, and is located on the spacer grid 3.

Here, the number of fixing holes 51 formed in the spacer grid jig 50 preferably corresponds to the number of unit grid cells (to which no reference number is given) of the spacer grid 3.

The laser tool jig 70 has a hexahedral shape, and has a plurality of guide through-holes 71, the number of which corresponds to the number of intersections between the strap connections 5a and 5b of the spacer grid 3 around which the laser tools 10a and 10b are inserted.

Here, each guide through-hole 71 of the laser tool jig 70 is formed in a cylindrical shape, and serves to maintain the laser tools 10a and 10b oriented in the vertical direction after the laser tools 10a and 10b are inserted around the strap connections 5a and 5b of the spacer grid 3.

As described, above, when the strap connections 5a and 5b between the inner grid straps 4a and 4b of the spacer grid 3 are welded by the aid of the spacer grid jig 50 and the laser tool jig 70 by means of the apparatus for welding inner grid straps of a spacer grid using a laser tool in accordance with the present invention, the spacer grid 3 is easily positioned and fixed. When the laser tools 10a and 10b are inserted around the strap connections 5a and 5b of the spacer grid 3, the laser tools 10a and 10b weld the strap connections 5a and 5b and are maintained in the vertical orientation at all times.

Hereinafter, a method of welding strap connections between inner grid straps of a spacer grid using the apparatus for welding strap connections between inner grid straps of a spacer grid using a laser tool will be described with reference to FIGS. 4 through 11.

First, a worker positions and fixes the spacer grid 3 under the spacer grid jig 50 (S11). At this time, all of the fixing holes 51 of the spacer grid jig 50 are seated and fixed on the upper surface of the spacer grid 3.

Then, the laser tool jig 70 is installed so as to allow the laser tools 10a and 10b to be inserted above the spacer grid 3 and be maintained in vertical orientation (S11-1), and to allow the guide through-holes 71 thereof to be matched with the intersections between the strap connections 5a and 5b between the inner grid straps 4a and 4b of the spacer grid 3.

The controller 30 is controlled, thereby moving the linear driver 35 in a horizontal direction to position the laser tool 10 having the laser tools 10a and 10b at a predetermined position above the strap connections 5a and 5b between the inner grid straps 4a and 4b of the spacer grid 3 (S12).

More specifically, the controller 30 is controlled, thereby moving the linear driver 35 in x, y and z directions to position the laser tools 10a and 10b of the laser tool 10 above the strap connections 5a and 5b between the inner grid straps 4a and 4b of the spacer grid 3.

Then, the controller 30 is controlled, thereby linearly moving the movable piece 33 in vertical directions to thus insert the laser tool 10 having the laser tools 10a and 10b around the strap connections 5a and 5b between the inner grid straps 4a and 4b of the spacer grid 3 (S13).

At this time, when inserted around the strap connections 5a and 5b between the inner grid straps 4a and 4b of the spacer grid 3, the laser tools 10a and 10b are guided into two of the guide through-holes 71 of the laser tool jig 70, and are then maintained in the vertical orientation (S13-1).

Next, laser beams are transmitted from the optical fibers 12 installed through the optical fiber connectors 12a on the upper ends of the laser tools 10a and 10b (S14), and then the transmitted laser beams are applied to the alignment lenses 15 provided on upper inner sides of the laser tools 10a and 10b through the optical fibers 12 (S15).

In this manner, the laser beams applied through the optical fibers 12 installed on the upper ends of the laser tools 10a and 10b are aligned while transmitting the alignment lenses 15, and are focused onto the focusing lenses 16 located below the alignment lenses 15 (S16). The laser beams focused onto the focusing lenses 16 are reflected onto the strap connections 5a and 5b between the inner grid straps 4a and 4b of the spacer grid 3 through the prisms 17 (S17).

Here, if the prisms 17 are replaced with concave copper mirrors (not shown), the laser beams that are aligned and focused through the alignment lenses 15 and the focusing lenses 16 are reflected by the concave copper mirrors, and then weld the strap connections 5a and 5b between the inner grid straps 4a and 4b of the spacer grid 3.

Here, each concave copper mirror has a tilt angle of 110 degrees, so that the laser beams can be reflected on the strap connections 5a and 5b more easily.

In this manner, the strap connections 5a and 5b between the inner grid straps 4a and 4b of the spacer grid 3 are laser-welded by the laser beams reflected from the prisms 17 (S18).

As described above, the reflected laser beams weld the strap connections 5a and 5b between the inner grid straps 4a and 4b of the spacer grid 3 by means of the laser tools 10a and 10b inserted around the strap connections 5a and 5b of the spacer grid 3, so that optimal penetration can be obtained, and the welding strength of the strap connections 5a and 5b of the spacer grid 3 can be increased.

Here, the laser tools 10a and 10b, which are inserted around the strap connections 5a and 5b between the inner grid straps 4a and 4b of the spacer grid 3, continuously or intermittently weld the strap connections 5a and 5b of the spacer grid 3 (S18-1). In other words, while moving upwards or downwards along the strap connections 5a and 5b of the spacer grid 3, the laser tools 10a and 10b, which are inserted around the strap connections 5a and 5b between the inner grid straps 4a and 4b of the spacer grid 3, continuously apply the laser beams to weld the strap connections 5a and 5b of the spacer grid 3 in their entirety, or intermittently apply the laser beams to weld part of the strap connections 5a and 5b of the spacer grid 3.

At this time, the upward and downward movement speeds of the laser tools 10a and 10b, which are inserted around the strap connections 5a and 5b between the inner grid straps 4a and 4b of the spacer grid 3 and continuously or intermittently weld the strap connections 5a and 5b of the spacer grid 3, are equal to each other.

The above-described structure allows the entire strap connections 5a and 5b of the spacer grid 3 to be continuously laser-welded after the laser tools 10a and 10b are inserted around the strap connections 5a and 5b of the spacer grid 3, or allows part of the upper, intermediate, and lower sides of the strap connections 5a and 5b of the spacer grid 3 to be intermittently laser-welded.

Figure 12:
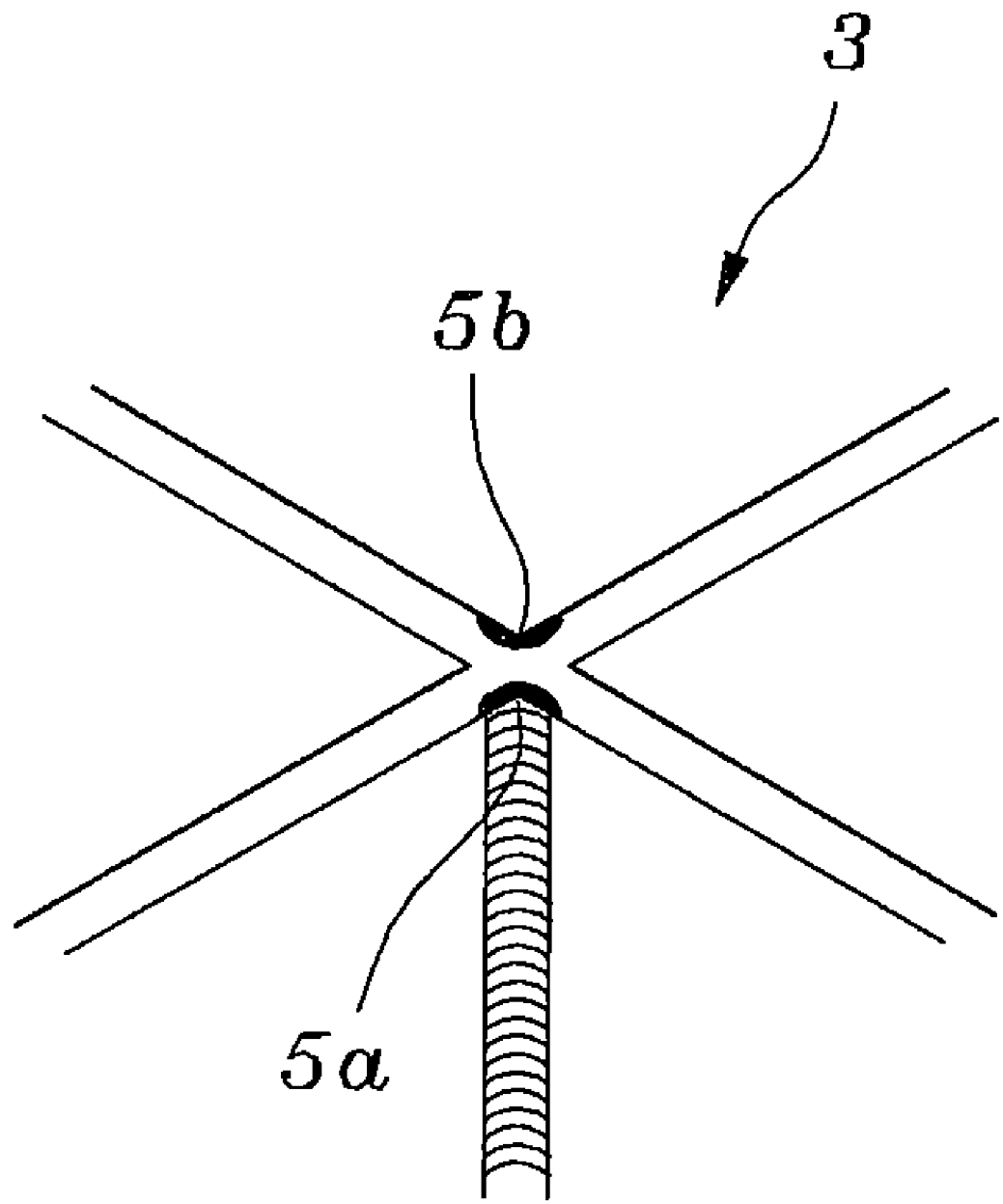
FIG. 12 schematically illustrates the state in which strap connections between inner grid straps of a spacer grid are continuously welded by an apparatus for welding strap connections between inner grid straps of a spacer grid using a laser tool in accordance with an embodiment of the present invention.
Figure 13:
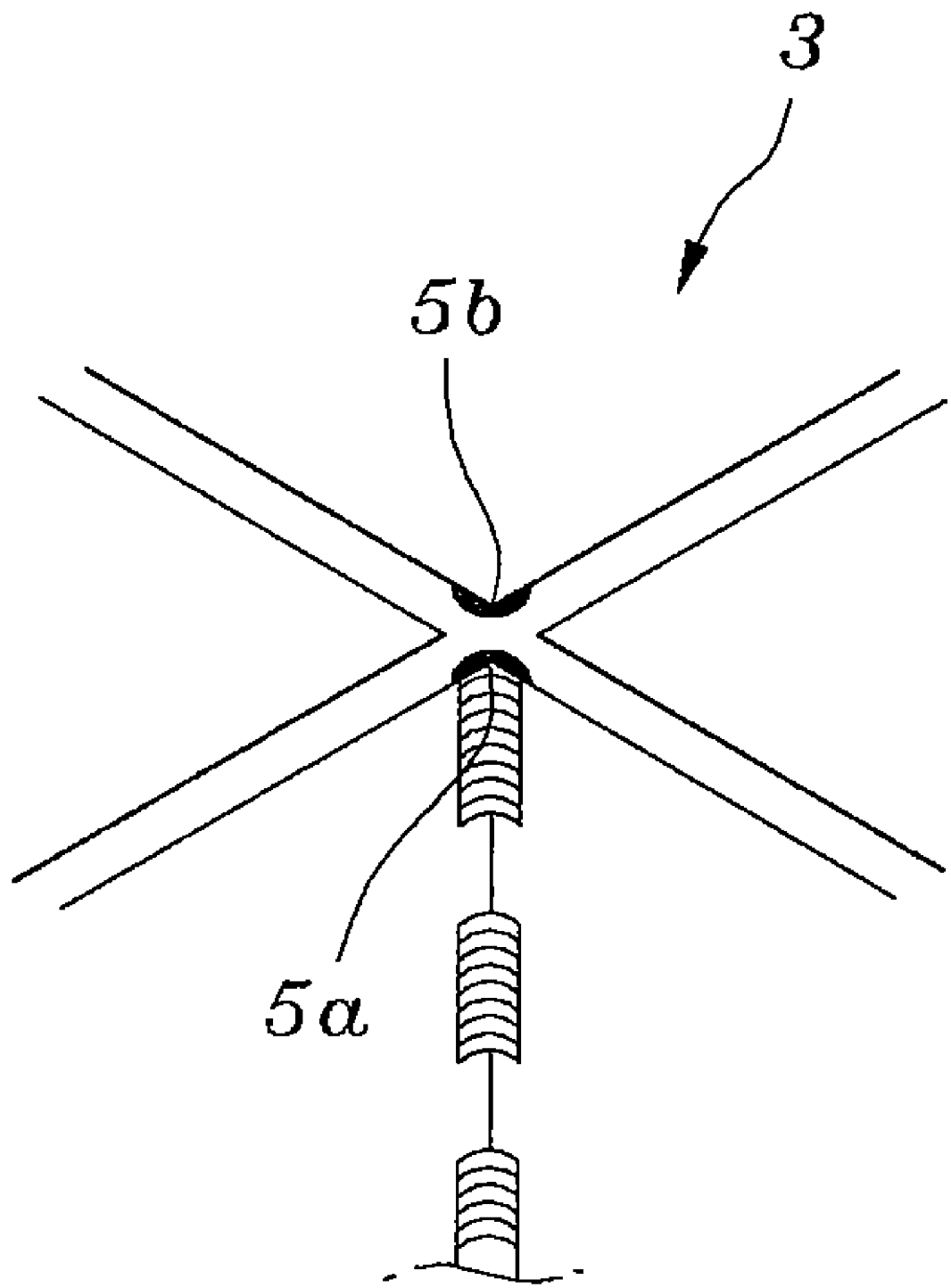
FIG. 13 schematically illustrates the state in which strap connections between inner grid straps of a spacer grid are intermittently welded by an apparatus for welding strap connections between inner grid straps of a spacer grid using a laser tool in accordance with an embodiment of the present invention.

In this manner, the laser tools 10a and 10b, which are inserted around the strap connections 5a and 5b between the inner grid straps 4a and 4b of the spacer grid 3, continuously laser-weld all of the strap connections 5a and 5b of the spacer grid 3 as illustrated in FIG. 12, or intermittently laser-weld only specific spots of the strap connections 5a and 5b of the spacer grid 3 as illustrated in FIG. 13. Thereby, the strap connections 5a and 5b of the spacer grid 3 can be laser-welded.

As described above, after the strap connections 5a and 5b between the inner grid straps 4a and 4b of the spacer grid 3 are laser-welded, the other strap connections 5a and 5b between the inner grid straps 4a and 4b of the spacer grid 3 are repeatedly laser-welded. Thereby, the laser welding is completed by the apparatus 1 for welding inner grid straps of a spacer grid using a laser tool in accordance with the present invention.

At this time, the assistant gases are supplied to the laser tools 10a and 10b, to which the laser beams are applied through the optical fibers 12, through the gas lines 18, thereby preventing the strap connections 5a and 5b between the inner grid straps 4a and 4b of the spacer grid 3 from becoming oxidized (S17-1).

In this manner, the assistant gases supplied through the gas lines 18 serve not only to prevent the strap connections 5a and 5b between the inner grid straps 4a and 4b of the spacer. grid 3 from being oxidized when the laser welding is performed, but also to protect the prisms 17.

Figure 14:
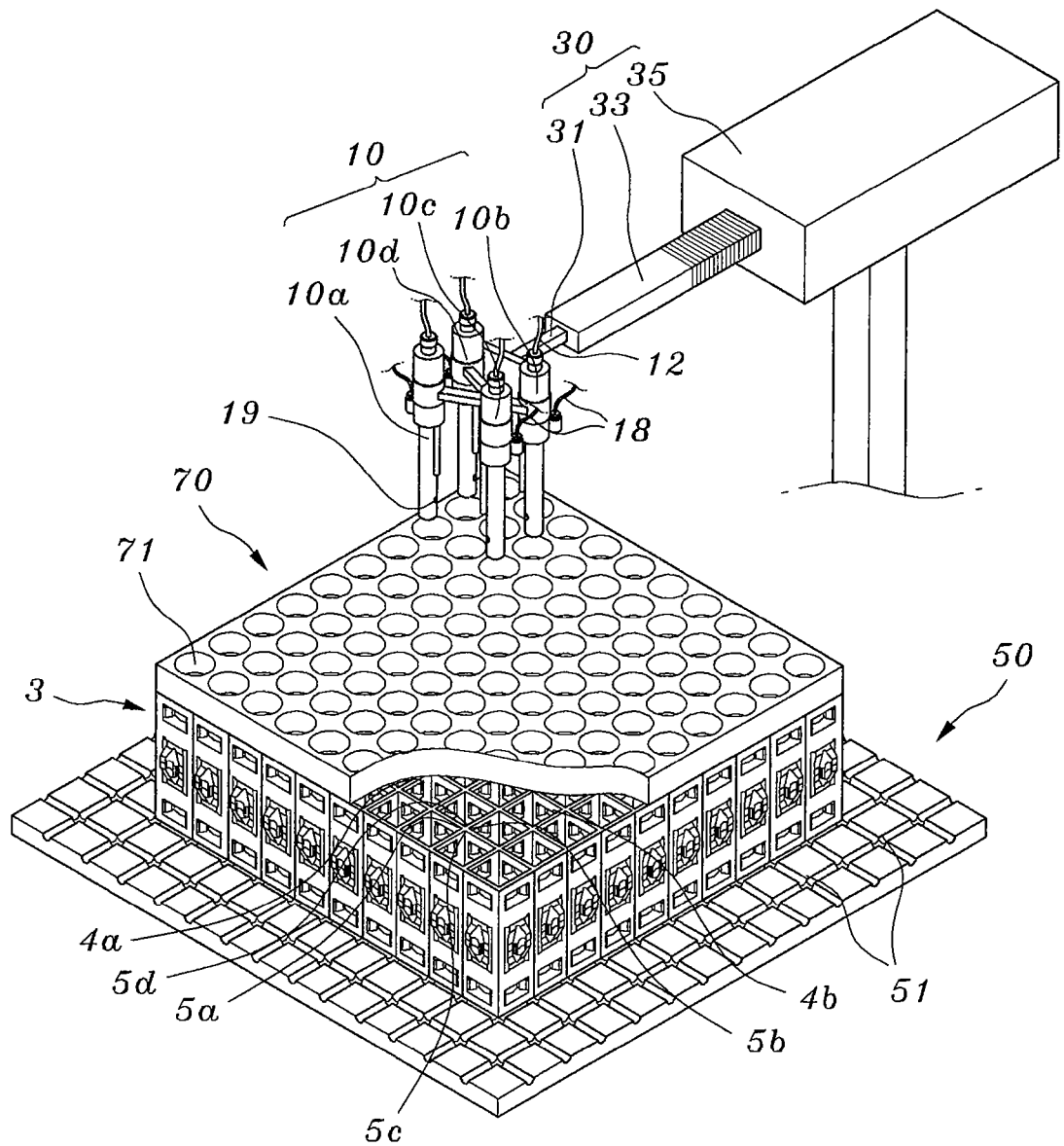
FIG. 14 is a perspective view schematically illustrating an apparatus for welding strap connections between inner grid straps of a spacer grid using a laser tool in accordance with another embodiment of the present invention.

FIG. 14 is a perspective view schematically illustrating an apparatus for welding strap connections between inner grid straps of a spacer grid using a laser tool in accordance with another embodiment of the present invention. The apparatus of this embodiment is different from that of the first embodiment in that the laser tools are changed in part.

As illustrated in FIG. 14, the apparatus 1 for welding strap connections between inner grid straps of a spacer grid using a laser tool in accordance with another embodiment has a different number of laser tools 10a, 10b, 10c and 10d, and thereby laser-welds four connections, i.e. strap connections 5a, 5b, 5c and 5d between the inner grid straps 4a and 4b of the spacer grid 3 at the same time.

In other words, the laser tools 10a, 10b, 10c and 10d are spaced apart from each other by a predetermined interval, and are inserted around the strap connections 5a, 5b, 5c and 5d between the inner grid straps 4a and 4b of the spacer grid 3, wherein each of the laser tools 10a, 10b, 10c and 10d has a cylindrical shape, is provided with an optical fiber 12 having an optical fiber connector 12a on an upper end thereof, and includes an alignment lens 15, a focusing lens 16, and a prism 17, which are installed therein in a downward direction in that order.

As described above, the laser tool 10 has four laser tools 10a, 10b, 10c and 10d, so that the laser tools 10a, 10b, 10c and 10d inserted around the strap connections 5a, 5b, 5c and 5d between the inner grid straps 4a and 4b of the spacer grid 3 can laser-weld the strap connections 5a, 5b, 5c and 5d in four directions at the same time. As a result, the strap connections 5a, 5b, 5c and 5d between the inner grid straps 4a and 4b of the spacer grid 3 can be laser-welded more quickly and easily.

To this end, the laser tools 10a, 10b, 10c and 10d are mutually connected to be spaced apart from each other by a predetermined interval by means of connecting pieces 11, and are provided with the prisms 17 on lower inner sides thereof so as to allow laser beams emitted therefrom to be focused on the strap connections 5a, 5b, 5c and 5d between the inner grid straps 4a and 4b of the spacer grid 3.

Alternatively, the prisms 17 provided on the lower inner sides of the laser tools 10a, 10b, 10c and 10d may be replaced with concave copper mirrors (not shown). In this case, each concave copper mirror preferably has a tilt angle of 110 degrees.

Meanwhile, in this embodiment, although the laser tool 10 includes the four laser tools 10a, 10b, 10c and 10d, it may include 16 laser tools. Therefore, the present invention is not limited with respect to the number of laser tools.

Further, as illustrated in FIGS. 6 and 7, the apparatus 1 for welding inner grid straps of a spacer grid using a laser tool in accordance with another embodiment of the present invention also includes a spacer grid jig 50 that has fixing holes 51 in a grid arrangement in order to fix the spacer grid 3, and a laser tool jig 70 that has a plurality of guide holes 71 in order to vertically guide the laser tools 10a, 10b, 10c and 10d inserted around the strap connections 5a, 5b, 5c and 5d between the inner grid straps 4a and 4b of the spacer grid 3 and to vertically fix the laser tools 10a, 10b, 10c and 10d.

As is apparent from the above description, according to the present invention, the strap connections between the inner grid straps of the spacer grid are seam-welded continuously or intermittently using a laser tool, so that the structural strength of the spacer grid is increased, a spattering phenomenon, in which a welded material is spattered after welding, is reduced, and thermal deformation is reduced. Further, fine welding is possible, and thus the welding bead of each strap connection between the inner grid straps can have a small size, and the number of welding defects can be reduced. In addition, the flow resistance of a coolant is reduced, and thereby a pressure drop of the coolant can be reduced. As a result, the load on a flow pump for the coolant can be reduced, and economic efficiency and safety can be improved.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for welding strap connections between inner grid straps of a spacer grid using a laser tool, in which the strap connections between the inner grid straps (4a and 4b) and between the inner and outer grid straps in the spacer grid (3) for a nuclear fuel bundle are welded, the apparatus comprising:

the laser tool (10) including a pair of laser tools (10a and 10b) that have a cylindrical shape and are spaced apart from each other by a predetermined interval, a plate-like connecting piece (11) that is interposed between the laser tools (10a and 10b) in order to connect the laser tools (10a and 10b), and optical fibers (12) that are inserted into and connected to upper ends of the laser tools (10a and 10b) by optical fiber connectors (12a) and transmit laser beams; and a controller (30) including a plate-like supporting piece (31) that is connected to a center of the plate-like connecting piece (11) of the laser tool (10), a movable piece (33) that is connected to the plate-like supporting piece (31), and a linear driver (35) that is connected to the movable piece (33), wherein each of the laser tools (10a and 10b) includes an alignment lens (15) provided on an upper inner side thereof in order to align the transmitted laser beam, a focusing lens (16) provided on a lower side thereof in order to focus the laser beam passing through the alignment lens (15), and a prism (17) provided below the focusing lens (16) in order to transmit the laser beam focused by the focusing lens (16) in a predetermined direction, wherein each of the laser tools (10a and 10b) includes a through-hole (19) formed at a suitable position in a lower outer circumference thereof so as to pass the laser beam transmitted through each prism (17), wherein each of the laser tools (10a and 10b) includes an alignment lens (15) provided on an upper inner side thereof in order to align the transmitted laser beam, a focusing lens (16) provided on a lower side thereof in order to focus the laser beam passing through the alignment lens (15), and a concave copper mirror provided below the focusing lens (16) in order to transmit the laser beam focused by the focusing lens (16) in a predetermined direction, further comprising a spacer grid jig (50) that has fixing holes (51) in a grid arrangement in order to fix the spacer grid (3), and a laser tool jig (70) that has a plurality of guide holes (71) in order to vertically fix the laser tools (10a and 10b) of the laser tool (10).

2. The apparatus as claimed in claim 1, wherein the prism (17) is positioned at an angle of 45 degrees.

3. The apparatus as claimed in claim 1, wherein each of the laser tools (10a and 10b) is provided with at least one gas line (18) for supplying assistant gas thereto at a suitable position thereof, and one end of the gas line (18) is connected near each prism (17).

4. The apparatus as claimed in claim 1, wherein the concave copper mirror has a tilt angle of 110 degrees.

5. The apparatus as claimed in claim 1, wherein the movable piece (33) linearly moves in a vertical direction.

6. The apparatus as claimed in claim 1, wherein the linear driver (35) linearly moves in a horizontal direction.

7. A method for welding strap connections between inner grid straps of a spacer grid using an apparatus for welding the strap connections, wherein the apparatus comprises: a laser tool (10) including a pair of laser tools (10a and 10b) spaced apart from each other by a predetermined interval, a plate-like connecting piece (11) interposed between the laser tools (10a and 10b) in order to connect the laser tools (10a and 10b), at least one gas line (18) supplying each of the laser tools (10a and 10b) with assistant gas at a suitable position of each of the laser tools (10a and 10b), optical fibers (12) provided with optical fiber connectors (12a) in order to transmit laser beams, and an optical system having an alignment lens (15), a focusing lens (16), and a prism (17) sequentially arranged in laser tools (10a and 10b) in an downward direction; a controller (30) including a plate-like supporting piece (31) that is connected to a center of the plate-like connecting piece (11) of the laser tool (10), a movable piece (33) that is connected to the plate-like supporting piece (31), and a linear driver (35) that is connected to the movable piece (33); a laser tool jig; and a spacer grid jig, the method comprising:

the step (S11) of fixing the spacer grid (3) to the spacer grid jig (50);

the step (S12) of controlling the controller (30) to drive the laser tool (10) in x, y, and z directions to a predetermined position above the strap connections (5*a* and 5*b*) between the inner grid straps (4*a* and 4*b*) of the spacer grid (3);

the step (S13) of controlling the controller (30) to move the movable piece (33) in a vertical direction and inserting the laser tools (10*a* and 10*b*) around the strap connections (5*a* and 5*b*) between the inner grid straps (4*a* and 4*b*) of the spacer grid (3);

the step (S14) of transmitting laser beams through the optical fibers (12) introduced through the optical fiber connectors (12*a*) on upper ends of the laser tools (10*a* and 10*b*);

the step (S15) of applying the laser beams transmitted through the optical fibers (12) to the alignment lenses (15) provided on upper inner sides of the laser tools (10*a* and 10*b*);

the step (S16) of focusing the laser beams aligned and transmitted by the alignment lenses (15) onto the focusing lenses (16) provided below the alignment lenses (15);

the step (S17) of reflecting the laser beams focused by the focusing lenses (16) through the prisms (17) provided below the focusing lenses (16); and the step (S18) of welding the strap connections (5*a* and 5*b*) between the inner grid straps (4*a* and 4*b*) of the spacer grid (3) by means of the laser beams reflected by the prisms (17), further comprising the step (S13-1) of, when the laser tools (10*a* and 10*b*) are inserted around the strap connections (5*a* and 5*b*) between the inner grid straps (4*a* and 4*b*) of the spacer grid (3), vertically guiding the laser tools (10*a* and 10*b*) toward guide holes (71) of the laser tool jig (70) and inserting the laser tools (10*a* and 10*b*) into the guide holes (71).

8. The method as claimed in claim 7, further comprising the step (S17-1) of discharging the assistant gases from the gas lines (18) to prevent the strap connections (5*a* and 5*b*) between the inner grid straps (4*a* and 4*b*) of the spacer grid (3) from being oxidized.

9. The method as claimed in claim 7, further comprising the step (S18-1) of continuously or intermittently welding the strap connections (5*a* and 5*b*) between the inner grid straps (4*a* and 4*b*) of the spacer grid (3) by means of the laser tools (10*a* and 10*b*) inserted around the strap connections (5*a* and 5*b*) between the inner grid straps (4*a* and 4*b*) of the spacer grid (3).

* * * * *